United States Patent
Stanney et al.

(10) Patent No.: US 11,551,407 B1
(45) Date of Patent: Jan. 10, 2023

(54) SYSTEM AND METHOD TO CONVERT TWO-DIMENSIONAL VIDEO INTO THREE-DIMENSIONAL EXTENDED REALITY CONTENT

(71) Applicant: Design Interactive, Inc., Orlando, FL (US)

(72) Inventors: Kay M. Stanney, Winter Park, FL (US); Matthew Archer, Oviedo, FL (US); Nicholas Brawand, Orlando, FL (US); Katherine Del Giudice, Oviedo, FL (US); Samuel George Haddad, Jr., Oviedo, FL (US); Jennifer M. Riley, Madison, MS (US)

(73) Assignee: Design Interactive, Inc., Orlando, FL (US)

(*) Notice: Subject to any disclaimer, the term of this patent is extended or adjusted under 35 U.S.C. 154(b) by 0 days.

(21) Appl. No.: 17/463,963

(22) Filed: Sep. 1, 2021

(51) Int. Cl.
*G06T 15/20* (2011.01)
*G06T 19/00* (2011.01)
(Continued)

(52) U.S. Cl.
CPC ............ *G06T 15/20* (2013.01); *A63F 13/525* (2014.09); *G06T 19/00* (2013.01); *G06V 20/41* (2022.01); *G06V 40/10* (2022.01); *G06T 2210/21* (2013.01)

(58) Field of Classification Search
CPC ..... G06T 15/20; G06T 19/00; G06T 2210/21; A63F 13/525; G06V 40/10; G06V 20/41
(Continued)

(56) References Cited

U.S. PATENT DOCUMENTS 8,103,646 B2   1/2012   Brown
8,189,905 B2   5/2012   Eaton et al.
(Continued)

FOREIGN PATENT DOCUMENTS

CN   101479765    8/2009
EP   2420975      2/2012
WO   2017171005   10/2017

OTHER PUBLICATIONS

Shi, Y., Chang, A. X., Wu, Z., Sawa, M., & Xu, K. (2019). Hierarchy denoising recursive autoencoders for 3D scene layout prediction. In Proceedings of the IEEE/CVF Conference on Computer Vision and Pattern Recognition (pp. 1771-1780).
(Continued)

*Primary Examiner* — Hai Tao Sun
(74) *Attorney, Agent, or Firm* — Terry M. Sanks, Esq.; Beusse Sanks, PLLC

(57) ABSTRACT

System and method are provided to detect objects in a scene frame of two-dimensional (2D) video using image processing and determine object image coordinates of the detected objects in the scene frame. The system and method deploy a virtual camera in a three-dimensional (3D) environment to create a virtual image frame in the environment and generate a floor in the environment in a plane below the virtual camera. The system and method adjust the virtual camera to change a height and angle relative to the virtual image frame. The system and method generate at an extended reality (XR) coordinate location relative to the floor for placing the detected object in the environment. The XR coordinate location is a point of intersection of a ray cast of the virtual camera through the virtual frame on the floor that translates to the image coordinate in the virtual image frame.

20 Claims, 9 Drawing Sheets

(51) Int. Cl.
*G06V 20/10* (2022.01)
*A63F 13/525* (2014.01)
*G06V 20/40* (2022.01)
*G06V 40/10* (2022.01)

(58) Field of Classification Search
USPC .......................................................... 345/419
See application file for complete search history.

(56) References Cited

U.S. PATENT DOCUMENTS

| | | | |
|---|---|---|---|
| 8,285,060 | B2 | 10/2012 | Cobb et al. |
| 8,346,020 | B2 | 1/2013 | Guntur |
| 10,713,594 | B2 | 7/2020 | Szeto et al. |
| 2011/0052000 | A1* | 3/2011 | Cobb ...................... G06T 7/246 |
| | | | 382/103 |
| 2012/0317108 | A1* | 12/2012 | Okazaki ................ G06F 3/0488 |
| | | | 704/235 |
| 2014/0125576 | A1* | 5/2014 | Asuke .................. A63F 13/5375 |
| | | | 345/156 |
| 2015/0178988 | A1 | 6/2015 | Montserrat Mora et al. |
| 2017/0206431 | A1 | 7/2017 | Sun et al. |
| 2020/0134911 | A1* | 4/2020 | van Hoff ................ G06T 7/251 |

OTHER PUBLICATIONS

Linder, T., Leon, M. H., Vaskevicius, N., & Arras, K. O. (2019). Towards training person detectors for mobile robots using synthetically generated RGB-D data. In Computer Vision and Pattern Recognition (CVPR) 2019 Workshop on 3D Scene Generation.

Yu, Z., Zheng, J., Lian, D., Zhou, Z., & Gao, S. (2019). Single-image piece-wise planar 3d reconstruction via associative embedding. In Proceedings of the IEEE/CVF Conference on Computer Vision and Pattern Recognition (pp. 1029-1037).

Nang, X., Zhou, B., Shi, Y., Chen, X., Zhao, Q., & Xu, K. (2019). Shape2motion: Joint analysis of motion parts and attributes from 3d shapes. In Proceedings of the IEEE/CVF Conference on Computer Vision and Pattern Recognition (pp. 8876-8884).

Fremont, D. J., Dreossi, T., Ghosh, S., Yue, X., Sangiovanni-Vincentelli, A. L., & Seshia, S. A. (Jun. 2019). Scenic: a language for scenario specification and scene generation. In Proceedings of the 40th ACM SIGPLAN Conference on Programming Language Design and Implementation (pp. 63-78).

Garcia-Garcia, A., Martinez-Gonzalez, P., Oprea, S., Castro-Vargas, J. A., Orts-Escolano, S., Garcia-Rodriguez, J., & Jover-Alvarez, A. (Oct. 2018). The robotrix: An extremely photorealistic and very-large-scale indoor dataset of sequences with robot trajectories and interactions. In 2018 IEEE/RSJ International Conference on Intelligent Robots and Systems (IROS) (pp. 6790-6797). IEEE.

Pittaluga, F., Koppal, S. J., Kang, S. B., & Sinha, S. N. (2019). Revealing scenes by inverting structure from motion reconstructions. In Proceedings of the IEEE/CVF Conference on Computer Vision and Pattern Recognition (pp. 145-154).

Liu, C., Kim, K., Gu, J., Furukawa, Y., & Kautz, J. (2019). Planercnn: 3d plane detection and reconstruction from a single image. In Proceedings of the IEEE/CVF Conference on Computer Vision and Pattern Recognition (pp. 4450-4459).

Yuan, W., Khot, T., Held, D., Mertz, C., & Hebert, M. (Sep. 2018). Pcn: Point completion network. In 2018 International Conference on 3D Vision (3DV) (pp. 728-737). IEEE.

Mo, K., Zhu, S., Chang, A. X., Yi, L., Tripathi, S., Guibas, L. J., & Su, H. (2019). Partnet: A large-scale benchmark for fine-grained and hierarchical part-level 3d object understanding. In Proceedings of the IEEE/CVF Conference on Computer Vision and Pattern Recognition (pp. 909-918).

Chen, Z., & Zhang, H. (2019). Learning implicit fields for generative shape modeling. In Proceedings of the IEEE/CVF Conference on Computer Vision and Pattern Recognition (pp. 5939-5948).

Sun, C., Hsiao, C. W., Sun, M., & Chen, H. T. (2019). Horizonnet: Learning room layout with 1d representation and pano stretch data augmentation. In Proceedings of the IEEE/CVF Conference on Computer Vision and Pattern Recognition (pp. 1047-1056).

Mehta, K. & Kotadia, Y. (2019). HomeNet: Layout Generation of Indoor Scenes from Panoramic Images Using Pyramid Pooling. Dwarkadas J. Sanghvi College of Engineering.

Park, J. J., Florence, P., Straub, J., Newcombe, R., & Lovegrove, S. (2019). Deepsdf: Learning continuous signed distance functions for shape representation. In Proceedings of the IEEE/CVF Conference on Computer Vision and Pattern Recognition (pp. 165-174).

Phalak, A., Chen, Z., Yi, D., Gupta, K., Badrinarayanan, V., & Rabinovich, A. (2019). DeepPerimeter: Indoor boundary estimation from posed monocular sequences. arXiv preprint arXiv:1904.11595.

Fang, K., Toshev, A., Fei-Fei, L., & Savarese, S. (2019). Scene memory transformer for embodied agents in long-horizon tasks. In Proceedings of the IEEE/CVF Conference on Computer Vision and Pattern Recognition (pp. 538-547).

Li, X., Liu, S., Kim, K., Wang, X., Yang, M. H., & Kautz, J. (2019). Putting humans in a scene: Learning affordance in 3d indoor environments. In Proceedings of the IEEE/CVF Conference on Computer Vision and Pattern Recognition (pp. 12368-12376).

Ramalho, T., Kocisky, T., Besse, F., Eslami, S.A., Melis, G., Viola, F., Blunsom, P., & Hermann, K.M., 2018. Learning to encode spatial relations from natural language.

Denninger, M., & Triebel, R. (Aug. 2020). 3d scene reconstruction from a single viewport. In European Conference on Computer Vision (pp. 51-67). Springer, Cham.

Kanazawa, A., Zhang, J. Y., Felsen, P., & Malik, J. (2019). Learning 3d human dynamics from video. In Proceedings of the IEEE/CVF Conference on Computer Vision and Pattern Recognition (pp. 5614-5623).

Huang, J., Zhang, H., Yi, L., Funkhouser, T., Nießner, M., & Guibas, L. J. (2019). Texturenet: Consistent local parametrizations for learning from high-resolution signals on meshes. In Proceedings of the IEEE/CVF Conference on Computer Vision and Pattern Recognition (pp. 4440-4449).

Ritchie, D., Wang, K., & Lin, Y. A. (2019). Fast and flexible indoor scene synthesis via deep convolutional generative models. In Proceedings of the IEEE/CVF Conference on Computer Vision and Pattern Recognition (pp. 6182-6190).

Wang, T. C., Liu, M. Y., Zhu, J. Y., Liu, G., Tao, A., Kautz, J., & Catanzaro, B. (2018). Video-to-video synthesis. arXiv preprint arXiv:1808.06601.

* cited by examiner

SYSTEM AND METHOD TO CONVERT TWO-DIMENSIONAL VIDEO INTO THREE-DIMENSIONAL EXTENDED REALITY CONTENT

STATEMENT REGARDING FEDERALLY SPONSORED RESEARCH OR DEVELOPMENT

Development for this invention was supported in part by Contract No. #HR001121C0071 from the Defense Advanced Research Projects Agency (DARPA). The government may have certain rights in the invention.

BACKGROUND

Embodiments relate to augmented and extended reality and, more specifically, to creating augmented or extended reality from two-dimensional content.

A long-felt need has existed for being able to create simulated real-world content via virtual representative scenarios. However, creating sufficiently rich context and content on platforms that include a computer system or processor including, but not limited to, personal computers, handheld devices, smart phones, gaming consoles, augmented reality devices and virtual reality devices, require a significant cost in terms of time, labor, and technical expertise. Designing the environmental setting, implementing relevant actions to simulate real-world events and interactions, designing and creating instructional content, and integrating all of these aspects within a digital form requires substantial effort. Thus, having an ability to rapidly and repeatedly create multiple, varied and useful scenarios is a significant barrier due to cost and the specialized skillsets involved.

Supporting technologies are emerging to resolve these challenges which may facilitate rapid scene replication and generate novel immersive content using approaches for automated object recognition, procedural generation of 3D assets, and human behavior modeling. Among these solutions are photogrammetry, laser scanning, ambient sensors, and crowd-sourced 3D modeling. These technologies facilitate capturing content from real-world settings and events. Machine learning (ML) and artificial intelligence (AI) are approaches to object detection and behavior capture, and these types of solutions can assist with translating existing media into a virtualized representation.

Though these technologies exist, they are not integrated where a reduction in significant cost in terms of time, labor, and technical expertise are possible. Users and manufacturers would benefit from a system and method that provides for a unified architecture that can achieve automated virtual scenario generation from existing media inputs.

SUMMARY

Embodiments relate to a system, a method and computer program product for using two-dimensional (2D) content such as, but not limited to, video content and transforming or converting the 2D content to three-dimensional (3D) content such as, but not limited to, extended reality (XR) or augmented reality (AR) content.

An aspect of the disclosure includes a method including, by at least one processor: receiving a two-dimensional (2D) video captured by an imaging device, the imaging device includes a first height and a first angle; detecting objects in a scene frame of the 2D video using digital image processing; determining object image coordinates of the detected objects in the scene frame; storing the detected objects in an asset database; deploying a virtual camera in a three-dimensional (3D) environment to create a virtual image frame in the 3D environment; generating a scene floor in the 3D environment in a plane below the virtual camera; adjusting the virtual camera to have a second height and a second angle to adjust the virtual image frame; and generating at an extended reality (XR) coordinate location relative to the floor for placing the detected object in the 3D environment, the XR coordinate location being a point of intersection of a ray cast of the virtual camera through the virtual frame on the floor that translates to the image coordinate in the virtual image frame.

Another aspect of the disclosure includes tangible, non-transitory computer storage media having programming instructions stored thereon which, when executed, cause at least one processor to: receive a two-dimensional (2D) video captured by an imaging device, the imaging device includes a first height and a first angle; detect objects in a scene frame of the 2D video using digital image processing; determine object image coordinates of the detected objects in the scene frame; store the detected objects in an asset database; deploy a virtual camera in a three-dimensional (3D) environment to create a virtual image frame in the 3D environment; generate a scene floor in the 3D environment in a plane below the virtual camera; adjust the virtual camera to have a second height and a second angle to adjust the virtual image frame; and generate at an extended reality (XR) coordinate location relative to the floor for placing the detected object in the 3D environment, the XR coordinate location being a point of intersection of a ray cast of the virtual camera through the virtual frame on the floor that translates to the image coordinate in the virtual image frame.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
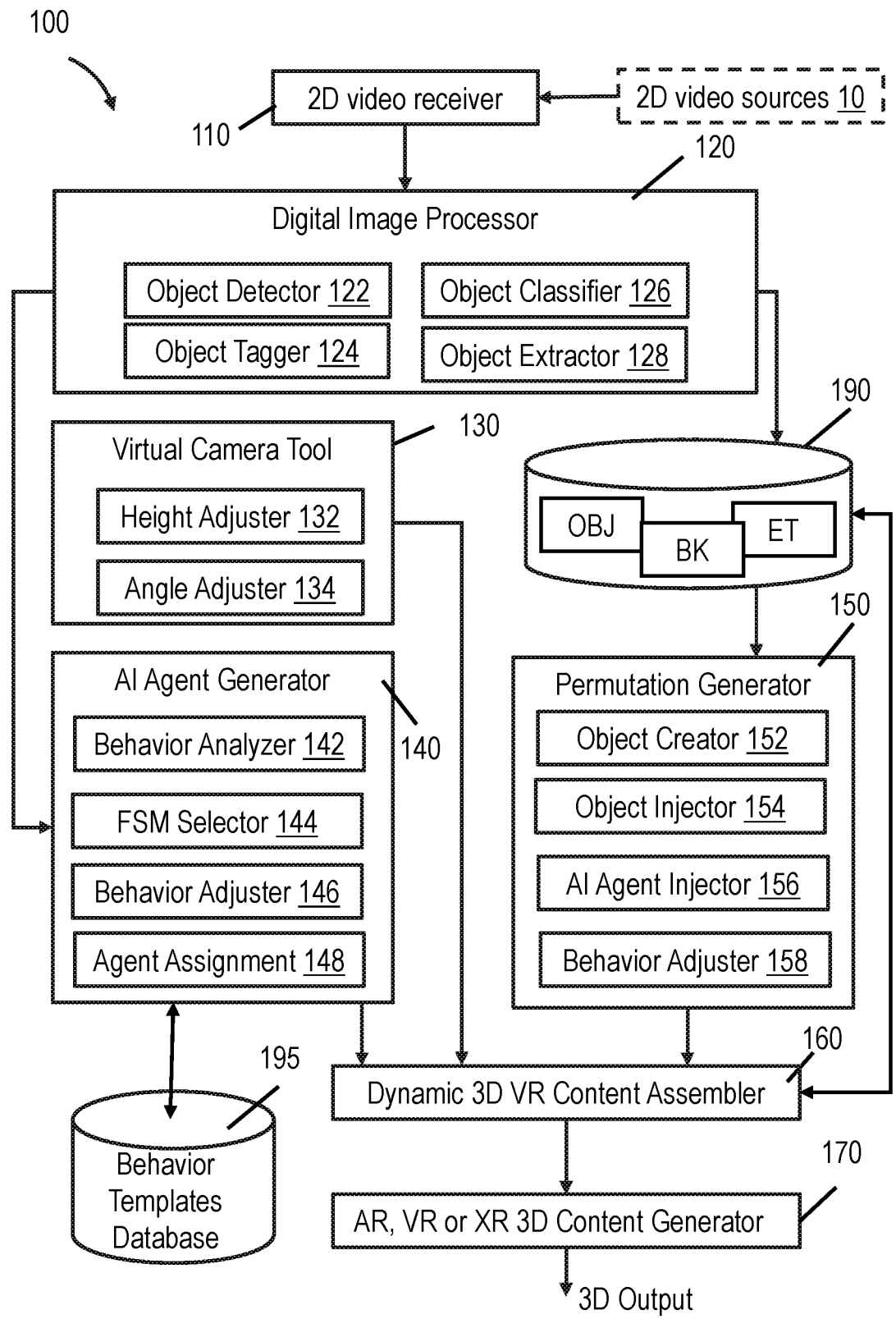
FIG. 1 shows a block diagram of system for generating three-dimensional (3D) extended reality (XR) content from two-dimensional (2D) content with an unknown camera features.

Embodiments are described herein with reference to the attached figures wherein like reference numerals are used throughout the figures to designate similar or equivalent elements. The figures are not drawn to scale, and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Embodiments disclosed herein provide for using two-dimensional (2D) content such as, but not limited to, video content and transforming or converting the 2D content to three-dimensional (3D) content such as, but not limited to, extended reality (XR) or augmented reality (AR) content.

FIG. 1 shows a block diagram of system 100 for generating three-dimensional (3D) extended reality (XR) content from two-dimensional (2D) content of a 2D video source 10 with an unknown camera features, for example. In some embodiments, the camera features or settings may be known. This embodiment may include additional elements that are beyond a basic embodiment. The system 100 may be configured to provide a special-purpose computing platform configured to allow an author, using graphical user interfaces, to develop 3D environments from one or more 2D video sources 10. The system 100 may populate a 3D environment with extracted objects from 2D video from a 2D video source 10, for example. The system 100 may incorporate both extracted classified objects from the 2D video and/or add simulated objects in the 3D environment. The system 100 may control artificially intelligent (AI) agents in the 3D environment. The AI agents may be representative of a human object in the 2D video. The human object may act in the same way as or have a different behavior than the behavior represented in the 2D video from the 2D video source 10.

The system 100 may include a 2D video receiver 110 configured to receive multi-media visual images, audio streams, and video source media and their identifiable content from the 2D video source 10. The system 100 may accomplish this by communication interfaces in computing system 900, described later in relation to FIG. 9. A graphical user interface may allow an author to select a particular one video source.

Identifiable content in a video frame identifies objects such as 'person' or 'car in the media streams. The image data is processed and a classifier using machine learning algorithms classify the objects. The objects are assigned an object identifier so that the object can be tracked as the object move around the scene.

Metadata from the media source associated with the video may be received and used, for example, with the translation of objects into 3D models. For example, a video frame or stream that has metadata of a resolution of 1920×1080 and 24 frames-per-second is processed by the at least one processor 952 to scale that resolution to the virtualized camera's resolution. The frame rate may be used to determine, when we are recreating the 3D scene, for example, where the entity should be mapped to in frames at time 0, 1, 2, 3, etc.

The system 100 may include a digital image processor 120 configured to process and convert visual images, audio streams and video source media and their identifiable contents and behaviors from single or multiple sources 10 into at least one object and/or at least one human entity. The digital image processor 120 may include an object detector 122 that may use machine-learning algorithms and/or neural networks to detect one or more objects in each frame of the 2D video. The digital image processor 120 may classify the background environment image data of the 2D video scene. Example, general background environments may include the following classifications: rural, urban, forest, beach, state, city, and country. The system 100 may select or recommend a pre-stored 3D scene environment which closely matches or correlates to the classified background environment. Example machine-learning algorithms and neural networks are described below in relation to FIG. 9. The digital image processor 120 may include an object tagger 124 configured to label and tag the detected object in the frame. The label and tagging function may provide object localization. The label and tag may represent image coordinates with the detected object in the 2D frame. The image coordinates include the (x,y) pixel location(s) in the 2D frame. The at least one processor may process the audio of a detected object so that it may be tagged and labeled for association with the corresponding object. By way of non-limiting examples, the machine-learning algorithms may identify and classify the detected audio content of a particular object in the 2D video into one of a plurality of audio types and then allow the author to tag it with a particular entity. The system 100 may be configured to substitute the tagged audio tag with a pre-stored simulated audio stored in memory. The system 100 may process the audio to determine background audio as well to supplement the 3D environment with classified background audio. For example, at a beach, classified background audio may include the sound of moving water, birds and light breeze. In a city, for example, classified background audio may include moving vehicles, horns, etc. In some scenarios, the original 2D audio content may include audio representative of a car crash. The system 100 may tag the audio and substitute a pre-stored audio segment representative of simulated car crash audio for the sounds of the recorded car crash.

Machine Learning algorithms may be used for audio. The machine learning algorithms may isolate particular sounds, and then use that to generate a 3D training equivalent, for example, or audio equivalent for other 3D environments. For example, if a person in the scene is "yelling," the system may detect audio that is representative of "yelling" and analyze the detected audio and deduce that a 'confrontation' is occurring. The machine learning algorithms may also detect audio and deduce that the detected audio is representative of urban/city/traffic sounds. The system may generate simulated audio for the 3D training equivalent, for example, or an audio equivalent for other 3D environments representative of simulated urban/city/traffic sounds.

The digital image processor 120 may include an object classifier 126. For example, objects may be vehicles, humans, animals, bicycles, balls, weapons, buses, and/or other objects. By way of non-limiting example, detecting vehicles may be performed by Region Convolutional Neural Networks (RCNN) or other deep learning machine learning architecture. For example, a vehicle may be classified by its orientation and pose. Weapons may be detected using feature extraction and classified. The digital image processor 120 may include an object extractor 128. The extracted objects (OBJ) are stored in an asset database 190. The objects may be modeled so that they are 3D objects. The digital image processor 120 may classify the scene of the 2D video so that objects may be classified, by way of non-limiting example. For example, a classified scene of a soccer field may be used to classify the detected ball as a soccer ball.

The system 100 may include artificially intelligent (AI) agent generator 140 configured to generate artificially intelligent agent within the 3D environment using the detected human entities in the identifiable contents of the 2D video. In some embodiments, the behaviors guide AI agent behaviors as captured from the 2D video, visual image, audio streams, and/or video source media. The AI agent generator 130 may include a behavior analyzer 142 configured to analyze the behavior of the human entities in the 2D video, for example. The system 100 may accomplish detection behavior by performing motion detection, human entity tracking, and behavior or activity prediction using machine-learning algorithms. For example, a human may be in a scene of the 2D video where a car accident occurred. When analyzing the behavior, did the human entity run toward the vehicle of the crash? Did the human entity get injured as the result of the car accident? Did the human entity fall to the ground? There are many possibilities, and this is just an example of possible behaviors. An activity may include playing a sport such as by contacting a sport ball, for example. The activity may include analyzing performance of a human entity when performing a particular behavior. In some embodiments, the 3D model may be a machine learning model. The machine-learning algorithms when classifying may identify whether the human object is a fireman, policeman, military soldier, guard, or a uniformed human. The machine-learning algorithms may be trained to identify more about the person (e.g., if they are a law enforcement officer) for a refined classification. The system 100 may be configured to select a 3D model that best matches the refined classification (e.g., policeman) to represent the corresponding AI agent in the 3D scene.

The AI agent generator 140 may include a finite state machine (FSM) selector 144 configured to select an FSM to control behaviors of the AI agent by controlling the behaviors of the human entity. The AI agent generator 140 may have default FSMs configured to cause the AI agent to "follow" the actions of the assigned entity detected in the 2D video. The AI agent generator 140 may include a behavior adjuster 146. The behavior adjuster 146 may look-up a behavior template in the behavior templates database 195. The behavior template may include scripts to guide the behaviors of the AI agent associated with the classification of the scene. For example, an author may change the behaviors of the AI agent in a scene.

The AI agent generator 140 may include a plurality of "person of interest" (POI) FSMs which may be manually or autonomously assigned to a particular agent so that the AI agent does particular behaviors consistent with the classification. For example, if the entity is classified as a policeman, the AI agent may be assigned a POI FSM that is programming to cause the AI agent to behave in a manner that simulates a policeman and, in a manner, consistent with the activities in the 2D video. Each behavior template may include a respective FSM. The behavior templates may include a default FSM and a plurality of POI FSM. For example, if the entities are football players, each AI agent may have a POI FSM associated with player positions on the team. By way of non-limiting example, a POI FSM may include a quarterback FSM including behaviors consistent with those of a quarterback. A POI FSM may include a running back on the team. By way of non-limiting example, a POI FSM may include a running back FSM including behaviors consistent with those of a running back. By way of non-limiting example, a POI FSM may include a football receiver FSM including behaviors consistent with those of a football receiver. As can be appreciated, it is prohibitive to describe each POI FSM herein. In a medical environment, the POI FSM may include activities of one of a doctor, nurse, surgeon, medical practitioner, medical technologist, etc.

As another POI FSM example, the POI FSM assigned to an AI agent may be programmed to cause an AI agent to hide behind a car, tree or other visually obstructive object in the generated 3D scene, if a policeman is nearby. This would cause the AI agent to behave entirely different based on the permuted scenario.

POI FSMs may include one or more POI FSMs for entities at a scene of an accident. For example, a scene of an accident may include a POI FSM for first responders. The AI agent assigned a first responder POI FSM may be configured to respond with behaviors for a classified "emergency event." A POI FSM may include a by-stander responder POI FSM. For example, an entity in the 2D video may be assigned as a by-stander responder POI FSM.

For example, using the example of the car accident, if the by-stander is running away from the car in the 2D video, the author may use a graphical user interface to cause the AI agent to instead run toward the car in 3D virtual scene by selecting a behavior template to control the actions of the AI agent. In this example, a by-stander POI FSM may be programmed to cause the AI agent to run toward the car in the accident and/or engage a driver of the vehicle. The AI agent generator 140 may include an agent assignment 148 configured to assign an AI agent to the FSM and the related behavior template. Behavior templates may be classified by activity such as sport scenarios, shopping, training, gaming scenarios, crime scene, etc. The 2D video may include images from surgeries with a surgeon performing certain behaviors to achieve an outcome. The behaviors may be targeted to achieve an outcome associated with the classified scene or 2D video. As can be appreciated, describing each and every behavior template herein is prohibitive.

The system 100 may include a permutation generator 150 configured to change 3D virtual scene of the 3D environment, by changing at least one of and object, AI agent, and the scene itself. For example, the permutation generator 150 may insert a computer-generated image (CGI) of a simulated or auxiliary object. As used herein, the simulated object is an object that may not be in the original scene of the 2D video. The permutation generator 150 may include an object creator 152 and an object injector 154, where the created object is injected into the 3D virtual scene of the 3D environment. The asset database 190 may include models of objects (OBJ) that can be looked up by an author and injected into the 3D environment. The author may be able to modify the stored model of the simulated or auxiliary object so that its appearance is appropriate for the 3D environment. By way of non-limiting example, the object injector 154 may generate the XR coordinates for the created object, as will be discussed in more detail in relation to FIGS. 2 and 6.

The permutation generator 150 may include an AI agent injector 156 and a behavior adjustor 158. By way of non-limiting example, the 3D environment may add or subtract AI agents from the original 2D scene for use in the 3D environment. The permutation generator 150 may then substitute other AI agents for those AI agents removed for incorporation into the 3D environment or add AI agents that are not from the original 2D scene. For example, an AI agent may be removed from the 3D environment such as if a sports player (e.g., AI agent) was caused to be injured based on a behavior change (e.g., fall on the field). Accordingly, another AI agent may be generated and substituted with its own set of behaviors controlled by an FSM. Still further, one or more AI agents may be added such as by adding crowds or other entities (e.g., police officers, team players, sports team player, etc.) to the 3D environment. The AI agent injector 156 and a behavior adjustor 158 may interface with the functions of the AI agent generator 140.

The system 100 may include a dynamic 3D XR content assembler 160 configured to assemble in the 3D environment at least one of object(s) extracted from the 2D image and an AI agent(s). The assembler 160 may place the detected object at the XR coordinate location. The dynamic 3D XR content assembler 160 may alter the 3D embodiment with permutations and AI agent behavior controls, for example. The dynamic 3D XR content assembler 160 will be described in more detail in relation to FIGS. 7A-7C.

Figure 9:
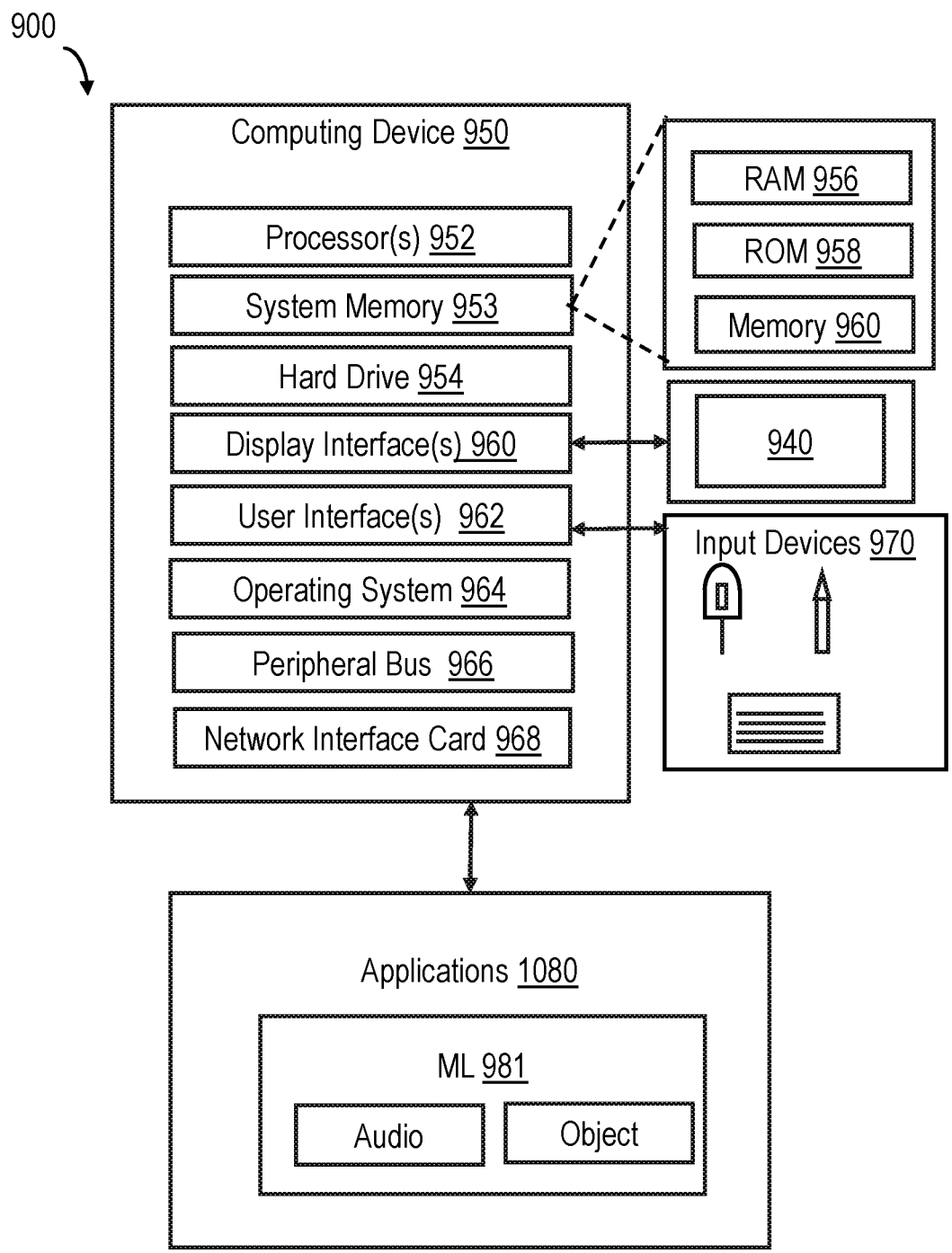
FIG. 9 illustrates an example of a basic configuration for a special-purpose computer system.

The system 100 may include an AR or XR 3D content generator 170 configured to generate an output video signal to a display device 940 (FIG. 9). The content includes the image data assembled by the dynamic 3D XR content assembler 160. It should be understood that no part of the system 100 are the author and user. The 3D environment may include a pre-stored 3D background (BK) asset that would be in the asset database 190, similar to the 3D humanoid models (ET).

The system 100 is a computer system that may include elements described in further detail in relation to FIG. 9.

Example 1

As a non-limiting example of a capability of the embodiments disclosed herein, if a user downloaded a video of a soccer game from an online source such as, but not limited to, YouTube®, the video may be uploaded to an embodiment disclosed herein where the embodiment will recreate the soccer game into XR or AR content. The user can then orient a view of the scene of the 2D video at any part or aspect of the game from an angle or position as determined by the user. As a non-limiting example, the 2D video may have been taken from a mid-field sideline view about 50-100 feet above the action. Using an embodiment disclosed herein, the user may select a view at field level anywhere along the sidelines or end lines of the soccer field, as a non-limiting example. The system 100 may receive 2D video and transform it into 3D XR content. In some embodiments, the system 100 may recreate the soccer game, but in 3D XR, so a user can experience the game from any angle/position desired. In some embodiments, the received 2D video may be from multiple cameras or multiple camera angles. In various embodiments, a single camera may capture the field of view used in the 3D environment. An important point here is that the system 100 does not require information about the position/orientation or features of the camera recording the scene of the 2D video. In some embodiments, the 3D virtual camera may be oriented to closely match the position of the camera capturing the 2D video.

In addition, system 100 can create permutations of the same scene. For example, the author could introduce a wall in the middle of the soccer field and the scene would play out very differently in system 100. The permutations created by the system 100 may be useful for training. Below is the step-by-step process system 100 follows to turn 2D video into 3D XR content. The system 100 may be configured to recreate a scene first and then permutations afterward so that training scenarios maybe develop, for example.

Figure 2:
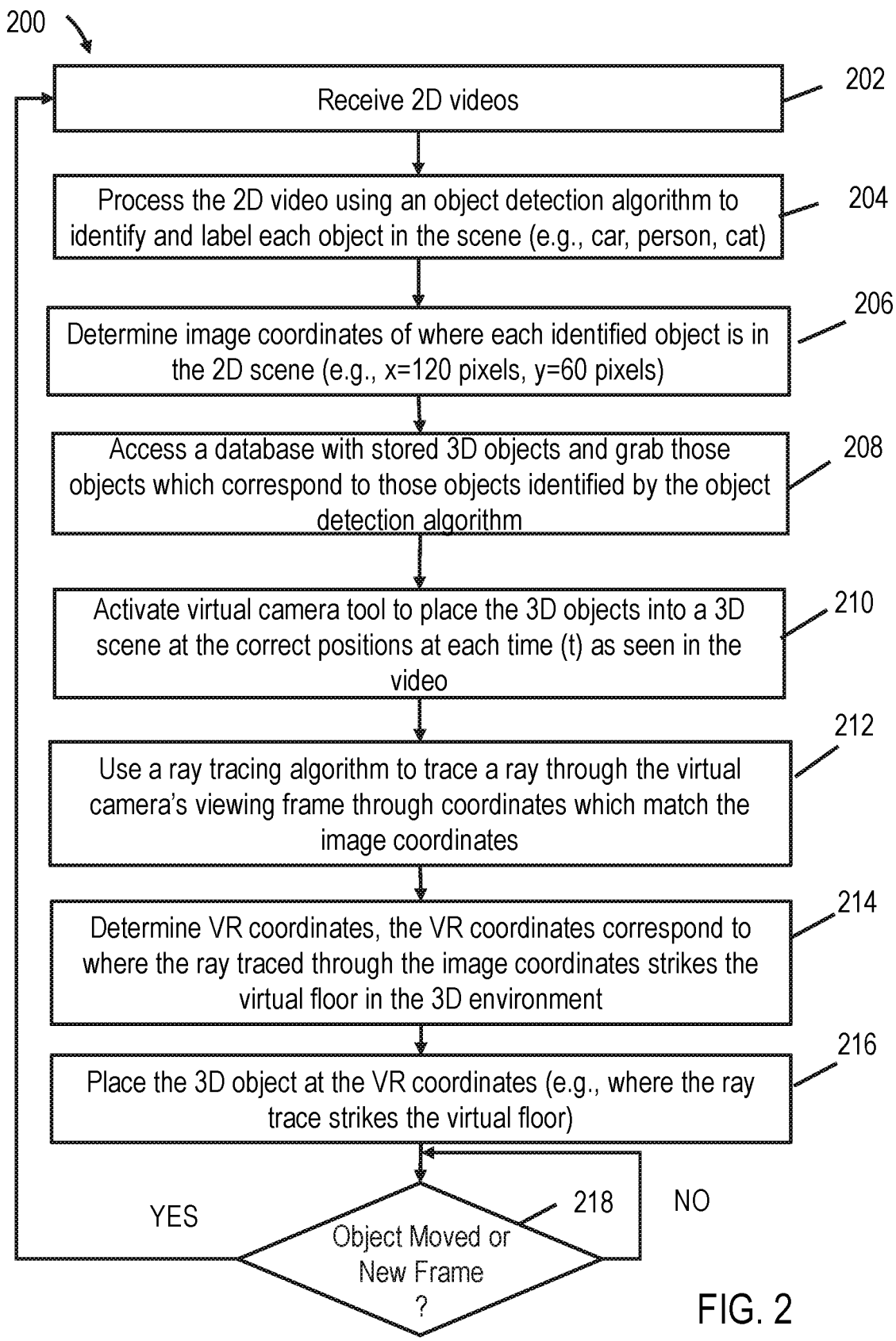
FIG. 2 shows a flowchart of a method for generating a 3D XR content from 2D content with unknown source camera orientation.

FIG. 2 shows a flowchart of method 200 for generating a 3D extended reality (XR) content from 2D content with unknown source camera orientation. The method 200 may include (at 202), by at least one processor 952, receiving 2D videos into the digital signal processor 120, where an object detection algorithm is performed. The 2D video may be captured by an imaging device such as, without limitations, a red, green, blue (RGB) camera device, a light detection and ranging (LiDAR) image capture device, CCD (charge-coupled device) sensor devices, CMOS (complementary metal-oxide semiconductor) senor devices, or other image capture devices. The imaging device is a source imaging device. The imaging device includes a first height and a first angle when capturing the 2D video or 2D image. However, the first height and first angle may be unknown to the author.

The method 200 is described in relation to a single extracted object. However, the steps 204-216 may be repeated for each detected object in the 2D video. The object may be a human entity.

The method 200 may include (at 204), by at least one processor 952 (e.g., digital image processor 120), detecting each object in a frame of the 2D video. The digital image processor 120 may perform object detection, tagging or labeling of objects and audio. The digital image processor 120 may label each object in the scene (e.g., car, person, cat) and generate coordinates (at 206) of where each object is in the scene (e.g., x=120 pixels, y=60 pixels), which are sometimes referred to as "image coordinates." The digital image processor 120 may detect objects in a scene frame of the 2D video using computer vision algorithms or machine-learning algorithms, described later in relation to FIG. 9.

The method 200 may include (at 208), by at least one processor 952, accessing an asset database 190 (FIG. 1) with the detected 3D objects and grabbing those objects which were identified by the digital image processor 120.

The method 200 may include (at 210), by the at least one processor 952, activating or deploying a virtual camera tool in a three-dimensional (3D) environment to create a virtual image frame in the 3D environment. The process for deploying the tool will now be described in relation to FIGS. 3 and 4.

Figure 3:
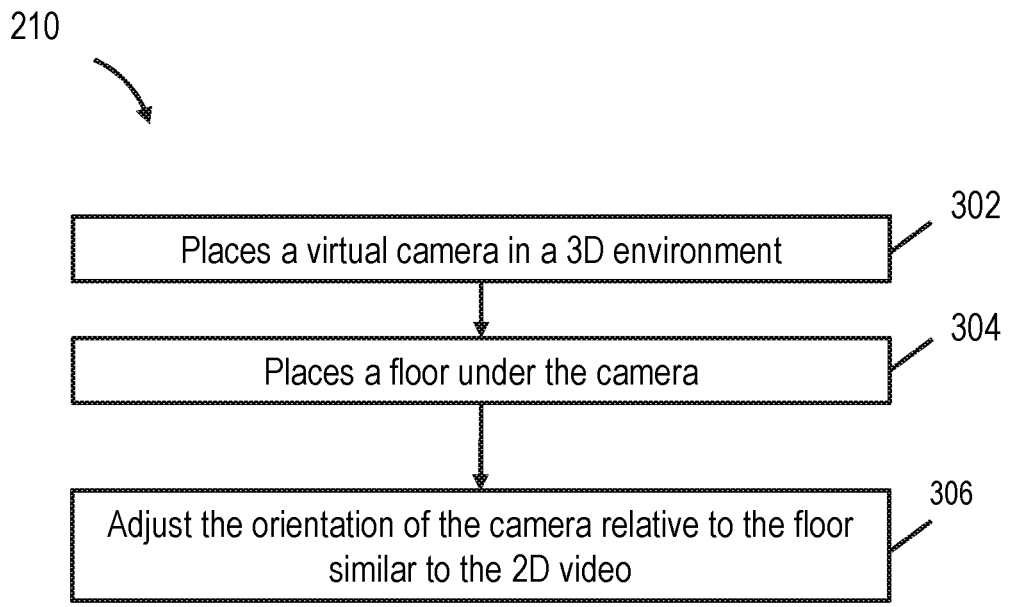
FIG. 3 shows a flowchart of a method for deploying a virtual camera tool in a 3D environment.
Figure 4:
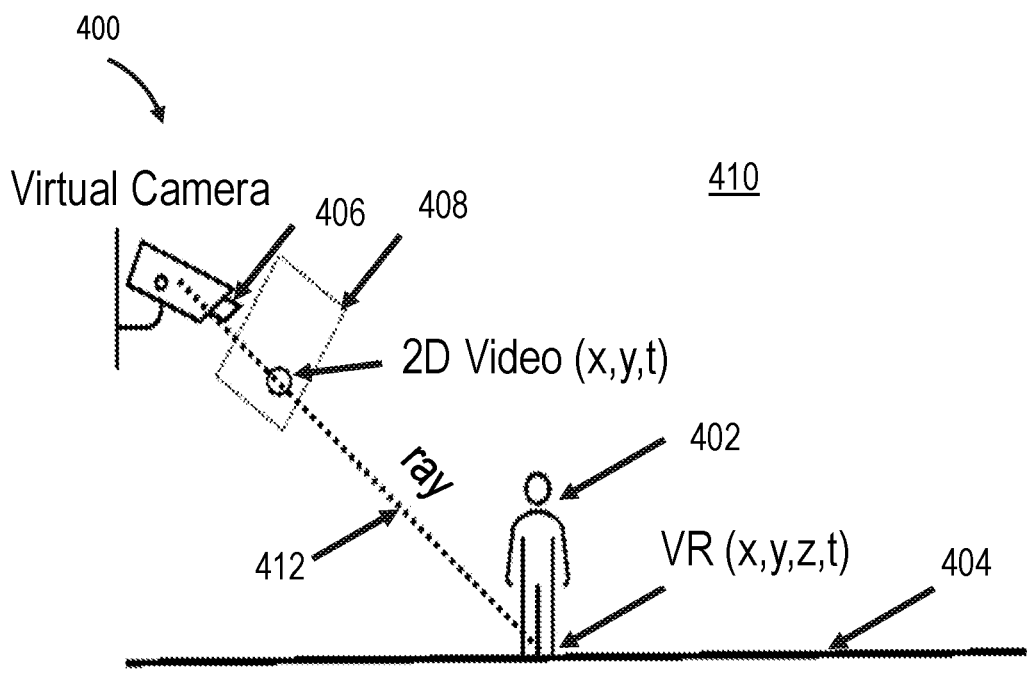
FIG. 4 shows a diagram of the deployed virtual camera tool and ray cast to point of intersection in 3D environment.

FIG. 3 shows a flowchart of a method 210 for deploying a virtual camera tool in a 3D environment. FIG. 4 shows a diagram of the deployed virtual camera tool 400 and ray cast to point of intersection in 3D environment 410. The method 210 may include (at 302), by at least one processor 952, placing a virtual camera tool 400 in a 3D environment 410. The method 210 may include (at 304), by at least one processor 952, placing a floor 404 in a plane under the virtual camera of the tool 400. The method 210 may include (at 306), by at least one processor 952, adjusting the orientation of the virtual camera relative to the floor. The adjusting of the virtual camera of the tool 400 may include adjusting the height and/or angle of the virtual camera lens 406. The system may include a graphical user interface to allow the virtual camera to be adjusted in height and angle, for example. The angle would tilt the camera so that it ray intersects the floor at a different angle. The height adjusts the distance between the camera and floor. In some embodiments, the author or system 100 may estimate the first height and the first angle of the source imaging device providing the 2D video. Therefore, when adjusting the second height and the second angle of the virtual camera, the adjustment causes the virtual camera tool 400 to match the estimated first height and the estimated first angle of the source imaging device.

In some embodiments, the author or system 100 may estimate a Birdseye view of the 2D video and adjust the height and/or angle of the virtual camera tool 400 to a Birdseye view. The system 100 may be configured to adjust the height and/or angle of the virtual camera tool 400 to be at head level. The system 100 may specify or estimate the orientation of the virtual camera relative to the floor 404 similar to the imaging device that captured the 2D video. The virtual camera placement may be a manual process or an automated process. The system 100 may estimate using machine-learning algorithms from each frame the position of the source imaging device providing the 2D video. The system may use "camera pose estimation" that finds the best pose of the camera based off the detected dimensions of the objects.

An example, camera pose estimation may be determined by solving a quadratic programming optimization problem for h and θ with the following objective function defined by:

$$L = \sum_i \sum_t \sum_k \left( y_k - \frac{hb_{itk}}{f\gamma} \right)^2 \quad (1)$$

with the constraints:

$$h \geq 0; \text{ and} \quad (2)$$

$$0 \leq \gamma \leq 1 \quad (3)$$

wherein: o—object index;
t—time index;
k—object kind (or type);
$b_{itk}$—the CV bounding box height and/or width for the ith object of type k at time t;

h—The camera height from the floor;
$y_k$ is the true height and or width of the kth object type;
f—is the focal length of the unity camera (available in a Unity editor);
γ=sin(θ)—The camera angle measured from pointing directly down toward the floor (θ=0) or looking parallel to the floor (θ=90). The angle could look upwards, but the system should make sure everyone is wearing appropriate clothing. Appropriate simulated clothing may be applied.

There are various tools that can solve this equation in Python or in Unity. The output will be the best camera position to minimize the sum of squared errors from the true object dimensions. This can be made time-dependent by performing a sum over only certain sections of time, but as written the sum is over all times t.

If quadratic optimization is used then γ could be written as a new variable, such as α=1/γ with the constraint that α≥1, the camera angle will then be θ=arcsin(1/α).

The above loss function ignores the fact that the box height is a function of the camera angle, so it is more accurate the closer the angle is to 90 degrees and objects toward the top of the screen. Object widths should not depend on this.

If the orientation of the virtual camera tool is too close to the floor, the objects in the 3D environment appear to move a relative distance based on the closeness. In some embodiments, the estimated angle or height of the 2D video may be is preserved. Two objects at the same place and time will always collide. Distances of objects may be dilated based on the virtual camera tool position and orientation.

Returning again to FIG. 2, the method 200 may include (at 212), by at least one processor 952, once the virtual camera tool 400 is in place, using a ray casting algorithm to cast a ray 412 through the virtual camera's viewing frame 408 through the coordinates which match the image coordinates created, at 206. The method 200 may include (at 214), by at least one processor 952, determining XR coordinates. The XR coordinates correspond to where the ray is cast through the image coordinates strikes (e.g., point of intersection) the virtual floor in the 3D environment 410.

The method 300 may include (at 216), by the at least one processor 952, placing the 3D object 402 at the XR coordinates. The object 420 may be transformed into an AI agent. The method 200 may include (at 218), by at least one processor 952, if the determination is "YES," repeating steps 202-216 for each new detected frame of the video and/or detect moving set of at least one object, which follows what was detected in the 2D video. On the other hand, if the determination (at 218) is "NO," the method loops back to the beginning of step 218.

The above steps recreate the movements of objects as a function of time. The at least one processor 952 places the objects into a 3D environment at the correct positions at each time as seen in the 2D video, for example. To add dynamic behavior, artificial intelligence is added to the 3D objects using additional logic, for example.

AI Implementation

Figure 5:
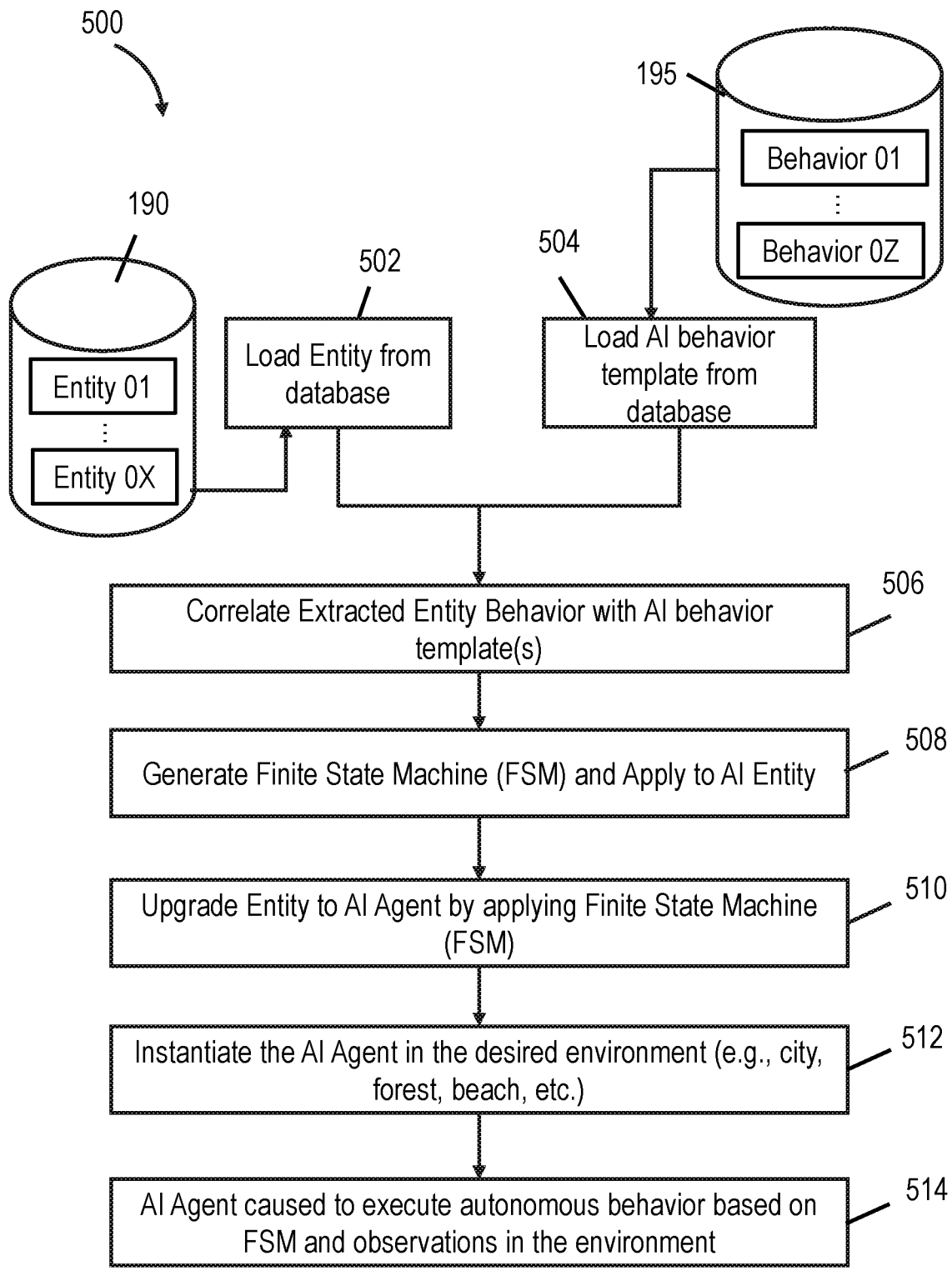
FIG. 5 shows a flowchart of a method for generating artificially intelligent (AI) agents in the 3D environment.

FIG. 5 shows a flowchart of a method 500 for generating artificially intelligent (AI) agents in the 3D environment. The method 500 may be performed by the AI agent generator 140 of FIG. 1. The method 500 may include at (502), by at least one processor 952, loading 3D entity information 01 . . . 0X, where X is an integer number greater than 1 from an asset database 190. The entity information may include human entities. The 2D video may have not detected entities (e.g., human objects) in the 2D video. The method 500 may include at (504), by at least one processor 952, loading AI behavior templates 01, . . . 0Z, where Z is an integer number greater than 1, from behavior templates database 195.

The method 500 may include at (506), by at least one processor 952, correlating extracted and analyzed entity behavior with AI behavior templates. The method 500 may include at (508), by at least one processor 952, generating finite state machine (FSM) for the entity. The method 500 may include at (510), by at least one processor 952, upgrading the entity to AI agent by applying the FSM. The method 500 may include at (512), by at least one processor 952, instantiating the AI agent in the desired 3D environment (e.g., city, forest, beach). The method 500 may include at (514), by at least one processor 952, executing by the AI agent autonomous behavior based on FSM and observations in the environment.

Pathfinding/traversal is an example, of a basic observation. For example, the AI agent would not be caused to walk into a street filled with traffic or into the ocean, if at the beach. Therefore, the FSM could add in specific observations based on the role or behavior of the AI agent (POI, First Responder, etc.) so that the behavior of the AI agent is consistent with a specific observations in the 3D scene. Various pathfinding tools may be used, as described below.

The FSM implements logic, such as if else statements, to control behavior of the AI agent depending on its environment. Controlling the AI agent with the modified FSM in the 3D environment translates to a respective image coordinate for the human object in the virtual frame to a second XR coordinate location in the 3D environment.

Example AI Behavior

Take for example a person (e.g., entity) walking in a crowded area. The person in the 2D video is converted into an AI agent (i.e., object 402 of FIG. 4) by associating an FSM with a single behavior called "follow target," for example. The target is associated with the ray that is being cast into the scene by the virtual camera. In other words, the image coordinates in the 2D video are cast and mapped into the 3D environment by the ray cast of the virtual camera tool 400. By following the target, the AI agent is guided by the walking path observed in the 2D video, but the AI "follow target" behavior is capable of navigating around other entities or objects in the 3D environment.

Figure 6:
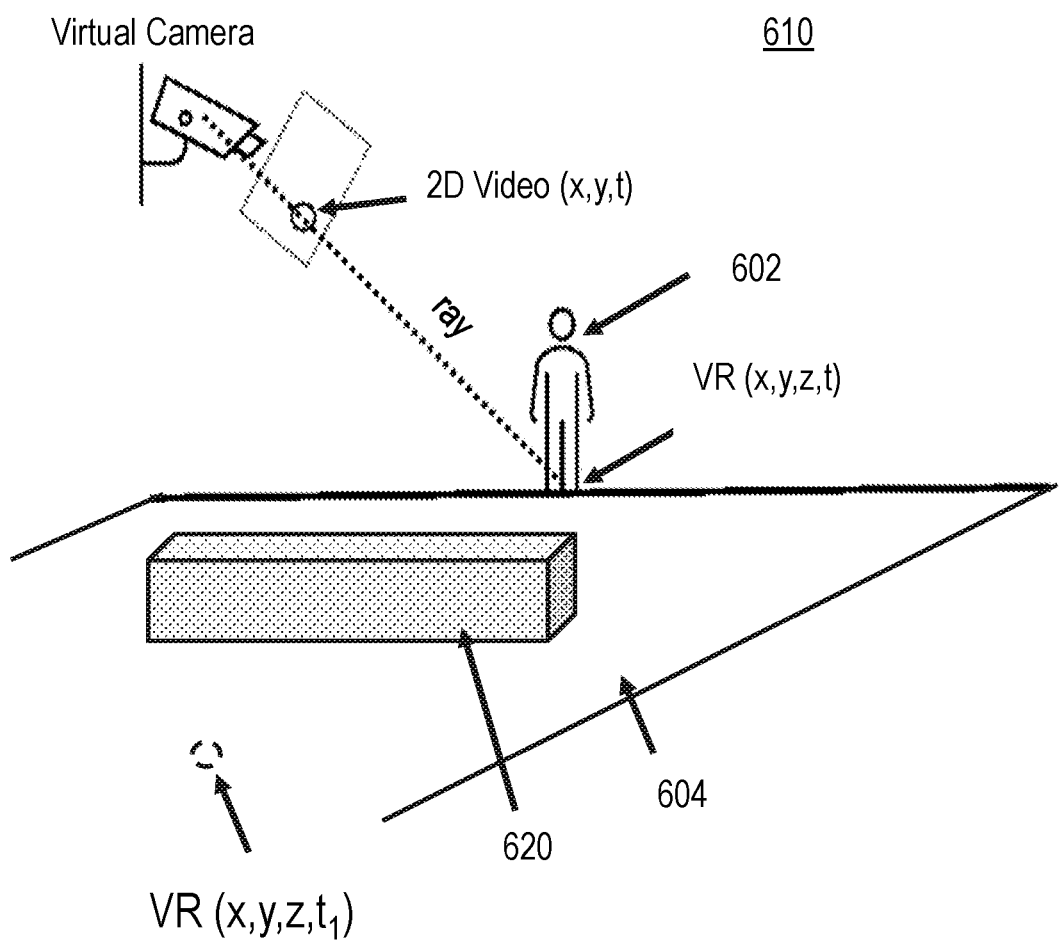
FIG. 6 shows a diagram of the deployed virtual camera tool and ray cast to point of intersection in the 3D environment.

FIG. 6 shows a diagram of the deployed virtual camera tool and ray cast to point of intersection in the 3D environment, as in FIG. 4, and with a simulated object 620 injected into the 3D environment 610. For example, if a simulated object 620 is placed in the 3D environment 610, the AI agent 602 may have a "follow target" behavior and may still end at the same predetermined location XR(x, y, z, $t_1$) as in the 2D video without a simulated object, where $t_1$ is a time in the future relative to time t. In this case, the AI agent 602 will adapt the behavior around the simulated object 620, but still arrive at the same intended target location XR(x, y, z, $t_1$) as in the 2D video.

The FSM may include behaviors which can be specific to each object or role and a user can manually specify which AI agents should implement which behaviors.

Permutations

The embodiments disclosed herein do not require any information about the position/orientation or features of the camera recording the original scene. In addition, the embodiments may create permutations of the same scene. As a non-limiting example, the user may introduce a wall (e.g., simulated object 620) in the middle of the soccer field and the scene would play out very differently in the scene. Thus, if the scene is one that is being used for a training scenario, complexity of the training may be increased or decreased by inclusion or removal of simulated object 620 within a defined scene, which create a permutation of the scene. An AI agent may use a pathfinding tool, which is based on existing industry methods such as navigational mesh artificial intelligence algorithms. A* pathfinding is another example of a pathfinding tool for an AI agent to traverse around the obstacle in a 3D scene.

The author may create useful permutations for XR content. However, the permutations are dynamic. The permutations generator 150 may create a permutation on a frame-by-frame basis, in some embodiments. A permutation may be a single change or multiple changes in a frame or a group of frames. The system 100 may, by the at least one processor 952, generate permutations of one or more frames in the 3D environment based on one or more frames of the 2D video.

The permutations generator 150 may generate a simulated 3D object and place the simulated 3D object into the one or more frames in the 3D environment at non-occupied XR coordinate locations associated with the one or more frames in the 3D environment. The simulated 3D object should not overlap an occupied XR coordinate location, such as a location occupied by an AI agent or detected object. The dynamic 3D XR content assembler 160 may generate at an XR coordinate location relative to the floor for placing an AI agent or object in the 3D environment according to the permutation. The system 100 may receive user-selected behaviors for controlling a simulated behavior of the AI agent, based on the simulated 3D object in the 3D environment. The permutations generator 150 may modify an FSM with the received behaviors. The AI agent is controlled in the 3D environment based on the modified FSM.

Figure 7A:
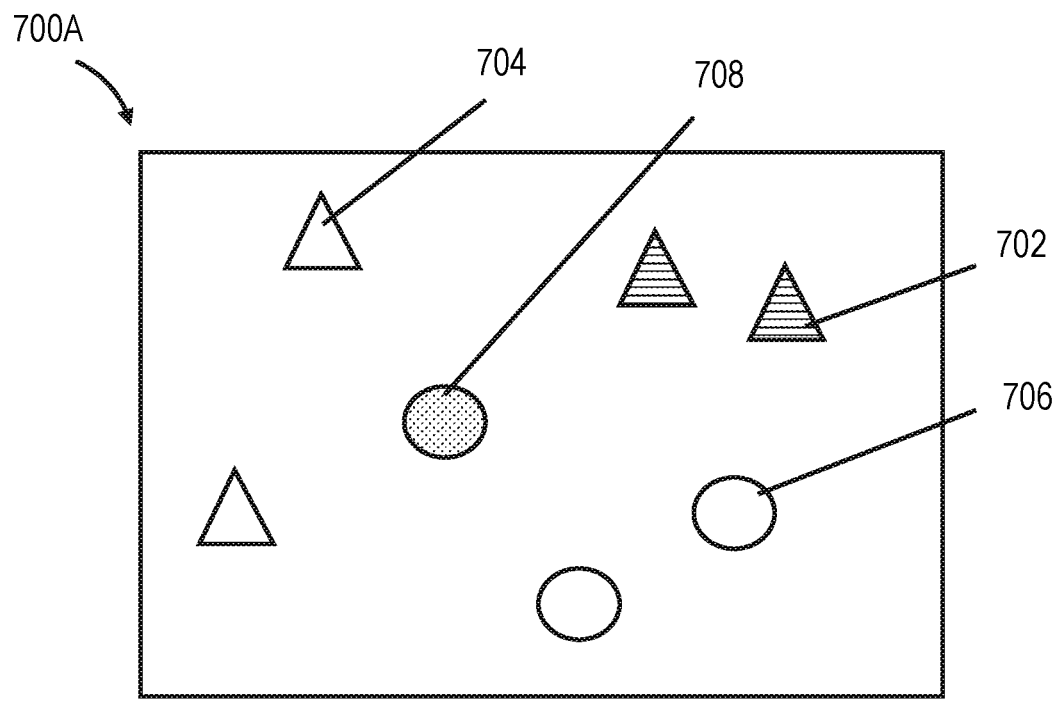
FIGS. 7A-7C show dynamic permutations of 3D environments for display as 3D XR content.
Figure 7B:
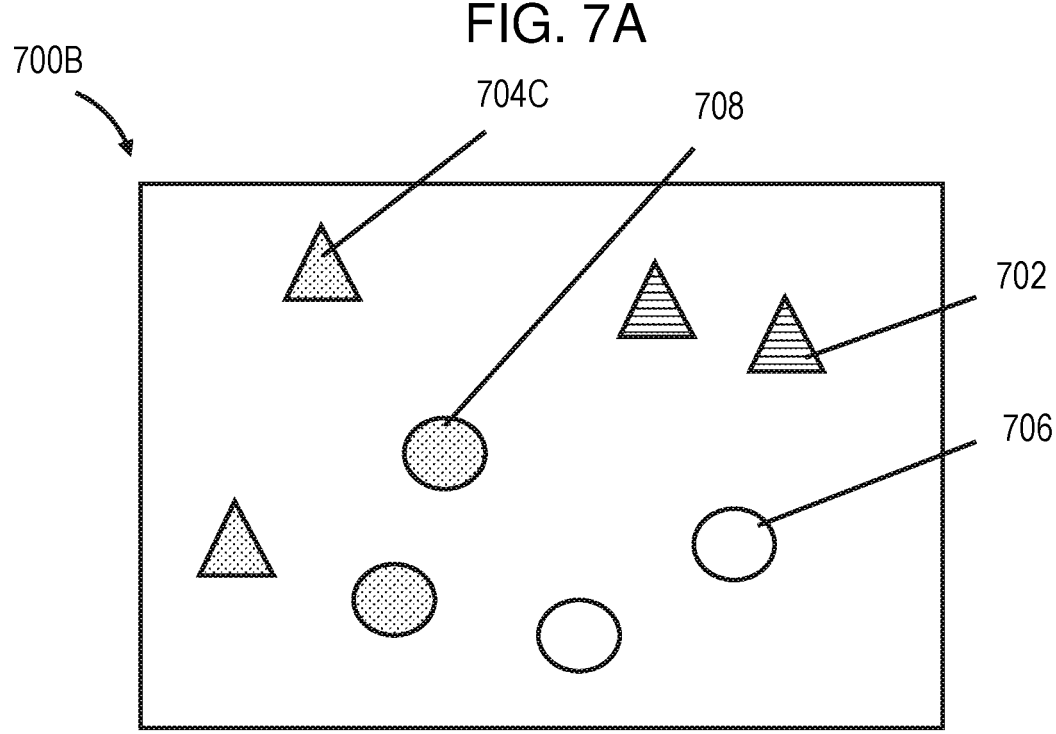
Figure 7C:
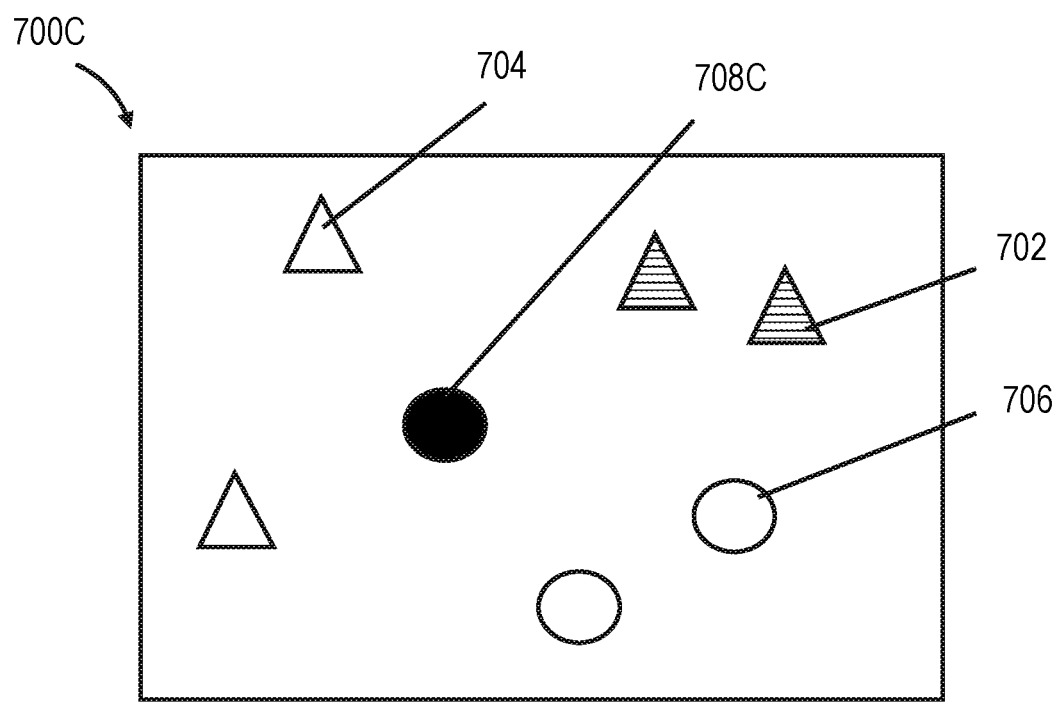

FIGS. 7A-7C show dynamic permutations of 3D environments for display as 3D XR content. The content is displayed to a user on a display device, for example, by the 3D content generator 170 which displays the assembled 3D XR environment. FIG. 7A shows an example 3D XR content 700A assembled by the dynamic 3D XR content assembler 160. Assume, the triangles are AI agents 702 and 704. The AI agent 702 is denoted with horizontal line hatching to denote that the behaviors of the AI agent 702 differ from the behaviors analyzed in the 2D video scene. However, the AI agents 702 follow the behaviors detected in the 2D video scene. In FIG. 7A, the circles 706 and 708 denote objects. Circle 708 denoted in dotted hatching represents a simulated object injected into the 3D environment that is assembled. Circles 706 denote 3D objected detected in the 2D video. The circles and triangles are each placed according to the XR coordinate location, as determined in FIG. 2.

FIG. 7B shows an example 3D XR content 700B assembled by the dynamic 3D XR content assembler 160. Assume, the triangles are AI agents 702 and 704C. The AI agent 702 is denoted with horizontal line hatching to denote that the behaviors of the AI agent 702 differ from the behaviors analyzed in the 2D video scene. The AI agents 702 follow the behaviors detected in the 2D video scene. AI agents 704C are denoted in dotted hatching. The AI agents 704C are added AI agents. The AI agents 704 in FIG. 7A were removed, for example. In FIG. 7B, the circles 706 and 708 denote objects. However, this permutation has two circles 708 denoted in dotted hatching to represent simulated objects injected into the 3D environment that is assembled. Accordingly, this permutation has multiple changes to vary the XR content.

FIG. 7C shows an example 3D XR content 700C assembled by the dynamic 3D XR content assembler 160. The content of FIG. 7C is similar to FIG. 7A, so only the differences will be described. This permutation has one change. In FIG. 7C, the circle 708C denoted as a black shaded circle may be a different simulated object than the object used in FIG. 7A, for example.

Training

Figure 8:
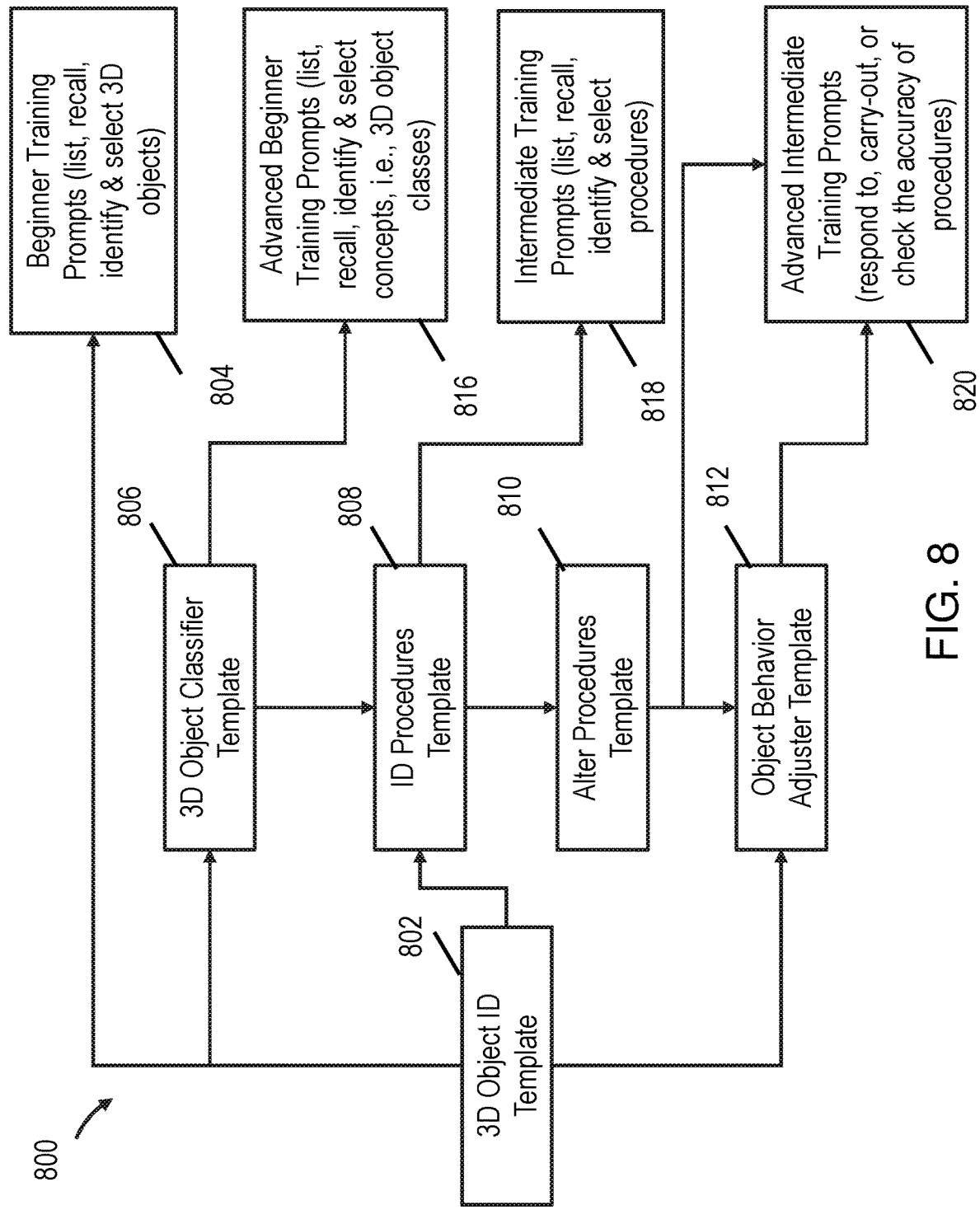
FIG. 8 shows a flow diagram of a method for training using the system of FIG. 1.

FIG. 8 shows a flow diagram of a method 800 for training using the system of FIG. 1. In general, the media is processed using machine-learning algorithms to extract the objects and classify them as entities (person 1, car 2). The system may take that classification and recreate a representative scene in 3D. The system may be configured to apply AI behaviors via the FSM to those generated entities.

At 802, the method 800 may identify a 3D object identification (ID) template. The templates address different levels of training. After obtaining the 3D object ID template, the method 800 may obtain a 3D object classifier template, at 806, an ID procedures template, at 808, and an object behavior adjuster template, at 812. For example, beginner training is focused on identifying objects. The system 100 may have an identify object template (at 802) which is filled by the set of 3D objects detected in the scene using object detection. The template may be configured to solicit from the trainee, listing, recalling, identifying or selection actions.

An intermediate training scenario would be for learning the sequence of operations from a video, such as in this case, a sequence of movements of every object in the scene. The user is presented with the starting configuration of all the objects in the scene. The user may be able to manipulate each object, such that the system checks if the objects are moved in the correct order and in the correct positions using the object detection and timestamping of the source media material.

For example, training for beginners, at 804, will be focused on prompting users to list, recall, or identify and select, say through looking at or gesturing towards or verbally listing, objects (objective and verifiable entities) and associated behaviors that have been automatically tagged in the content. The system 100 may have an identify object template which is filled by the set of 3D objects detected in the scene using object detection. The template may be configured to solicit from the trainee, listing, recalling, identifying and/or selection actions.

For example, for a beginner, if a selected scene is converted to a training application, such as directed to applying a tourniquet to an individual that had an injury that was hemorrhaging, then critical objects in the selected scene might be the injured individual, the extremity of the individual that sustained the injury, blood pooling from the injury, the tourniquet, the caretaker, gloves and protective eyewear, and the hands of the caretaker that are applying the tourniquet. The graphical user interface (GUI) of a training template may require the trainee to identify the injured limb and recall that a tourniquet must be applied to the injury. The GUI may include a window to display the critical objects of the scene and training queries with data entry fields or radial buttons for entering or selecting answers.

The method 800 may, after 806, proceed to training for an advanced beginner, at 816, that will be focused on prompting users to list, recall, or identify and select, say through looking at or gesturing towards or verbally listing, concepts (a group of objective and verifiable entities that share common features and/or behaviors, and vary on irrelevant features and/or behaviors) that have been automatically tagged in the content. The system 100 may have an Object Classifier template which is filled by classifying and clustering the set of 3D objects detected in the scene using object detection based on common features. The template may be configured to solicit from the trainee recalling, identifying, selecting, and classifying (by grouping/clustering) actions.

For example, for an advanced beginner, a number of massive hemorrhage injuries could be extracted from a set of scenes, once the critical objects in the scene were identified and sorted into categories via an AI Agent (e.g., type of massive hemorrhage injury), then the trainee might be presented with a number of the identified injuries, asked to evaluate whether or not a tourniquet can be applied to each injury, and then asked to identify and sort the injuries into two groups: 1) compressible (external) hemorrhage not amenable to limb tourniquet use that must be treated instead via hemostatic dressing, or 2) injuries amenable to limb tourniquet use. A GUI may include a window to display the critical objects of the scene and training queries with data entry fields or radial buttons for entering or selecting answers.

The method 800 may, after 806, proceed to 808.

The method 800 may, after 808, proceed to an intermediate training scenario, at 818, will be focused on prompting users to list, recall, or identify and select, say through looking at or gesturing towards or verbally listing, procedures (a series of clearly defined steps and associated objects and object behaviors) that have been automatically tagged in the content. The system 100 may have an identify procedure template which is filled by the sequence of movements and behaviors of every 3D object detected in the scene using object detection. The template may be configured to solicit from the trainee recalling, identifying, selecting, sequencing and positioning actions. The user will be presented with a starting configuration of all the objects in the scene. The user will be able to manipulate through looking at gesturing towards or verbally listing each object, such that the system checks if the objects are moved in the correct order/sequence, associated with the correct behaviors, and in the correct positions using the object detection and ray tracing results. For example, for an intermediate scenario, a GUI may include a list of steps for applying a tourniquet to a massive hemorrhage that could be extracted from a scene. Then the list could be randomly sorted and trainee could be required to put the steps into the correct order using the GUI. An example list may include: 1) look for spurting, pulsating, steady red blood from a wound or a puddle of blood under body part or soaked bandaging that does not control bleeding or casualty in shock; 2) grab tourniquet; 3) grab and put on gloves and protective eyewear; 4) apply pressure to pressure point above the wound; 5) expose the wound enough to ensure the tourniquet can be placed above the injury; 6) place tourniquet between the heart and the wound on the injured extremity two-three inches above the wound; 7) i uncertain of bleeding site, apply tourniquet high and tight on affected limb; 8) pull the free end of the tourniquet through the buckle, route band tight around the extremity and fasten it back on itself via Velcro strap; 9) Twist the windlass until the bleeding stops; 10) lock the windlass in place with the windlass clip; and 11) assess for the absence of a distal pulse. A GUI may include a window to display the randomly sorted list with radial buttons, data entry field, or other mechanism for selecting or entering answers or ordering the list.

The method 800 may, after 808, proceed to 810, where an alter procedure template is obtained. The alter procedure template of 810 may proceed to 812, both 810 and 812 proceed to 820.

An advanced intermediate training scenario, at 820, will be focused on prompting users to respond to, carry-out, or check the accuracy of, say through looking at or gesturing towards or verbally listing, incomplete or inaccurate procedures (a series of clearly defined steps and associated objects and object behaviors) that have been automatically tagged in the content. The system 100 may have an alter procedure template which is filled by the sequence of movements of every 3D object detected in the scene using object detection and then manipulated by an AI agent to present an incomplete or inaccurate procedure. The template may be configured to solicit from the trainee identifying, selecting, resequencing, and positioning actions. The system 100 may have an Object Behavior Adjuster template which is filled by using an AI Agent Injector to assign an incorrect behavior to an object to present an object with an incorrect behavior. The template may be configured to solicit from the trainee identifying, selecting, and behavior assigning actions. The user will be presented with an incomplete or inaccurate configuration of objects in the scene. The user will be able to add and/or manipulate objects and their behaviors through looking at gesturing towards or verbally listing each object, such that the system checks if the objects are moved in the correct order, assigned to the correct object behavior, and in the correct positions using the object detection and ray tracing results.

For example, for an advanced intermediate scenario, a GUI may provide a list of steps for applying a tourniquet to a massive hemorrhage extracted from a scene. Then an AI agent could insert an inaccuracy into the procedure and the trainee could be required to identify the inaccuracy and correct the procedure. For example, a tourniquet could be placed more than two-three inches above a wound or the tourniquet could be placed between the wound and the feet rather than the wound and the heart and the trainee would have to reposition the tourniquet. Another example would be for the scenario to show the windlass not being turned tight enough to stop the bleed and the trainee would have to identify that the windlass needed to be turned more. Or a step could be left out, like checking for the absence of a distal pulse and the trainee would have to recognize that a step was missing. The GUI would provide data entry fields or other mechanism of entering information in response to queries on the GUI.

Referring now to FIG. 9, in a basic configuration, a special-purpose computer system 900 is illustrated. The computer system 900 may be an electronic device, a personal computer, laptop, desktop, web-enabled computing device, a head-worn device (HWD) computing device, or a server, for example. The computer system 900 may include a computing device 950, which may also have additional features or functionality. The computing device 950 may include any type of stationary computing device or a mobile computing device. For example, the computing device 950 may also include one or more processors 952 and an operating system 964 stored in a hard device 954. The operating system 964 may be configured as programming instructions which may be executed by the one or more processors 952.

The computing device 950 may include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory 953, removable storage and non-removable storage are all examples of computer storage media. Computer storage media includes, but is not limited to, RAM 956, ROM 958, Electrically Erasable Read-Only Memory (EEPROM), flash memory 960 or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data, and which can be accessed by the computing device. Any such computer storage media may be part of the device. The computer system 900 may include applications 980 including machine-learning algorithms 981 and neural networks such as artificial neural networks (ANN), convolutional neural networks (CNN), and generative adversarial networks (GAN), for example. The machine-learning algorithms may include supervised learning algorithms, unsupervised learning algorithms, semi-supervised learning algorithms, supervised learning algorithms, for example. The applications 980 may include digital image processing techniques for object detection which may be performed using machine-learning algorithms associated with image processing, such as without limitations, algorithms for feature extraction, background subtraction, texture detection, edge detection, corner detection, perspective views, motion detections, and semantic segmentation, for example.

The computing device 950 may also include or have user interfaces 962 for user input device(s) 970 such as a keyboard, mouse, pen, voice input device, touch input device, etc. The computing device 950 may include or have display interfaces 960 for connection to output device(s) such as at least one display device 940 via display drivers, speakers, etc. wherein the display device is coupled to a computing device comprising the at least one processor, the computing device including one of desktop computing platform, web-enabled computing platform, mobile computing platform, or head-worn device (HWD) computing platform.

The computing device 950 may include a peripheral bus 966 for connecting to peripherals. The computing device 950 may contain communication connection(s) that allow the communication systems to communicate with other computing devices, such as over a network or a wireless network. By way of example, and not limitation, communication connection(s) and protocols may be compatible with wired media such as a wired network or direct-wired connection, and wireless media such as acoustic, radio frequency (RF), infrared and other wireless media of the communication system. The computing device 950 may include a network interface card 968 to connect (wired or wireless) to a network.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. The program code may include hardware description language (HDL) or very high-speed integrated circuit (VHSIC) hardware description language, such as for firmware programming. Some modules or routines may be written in assembly language or even micro-code to enhance performance and/or memory usage. It will be further appreciated that the functionality of any or all of the program modules may also be implemented using hardware, software, firmware or a combination thereof. For example, the program modules may be implemented using discrete hardware components, one or more application specific integrated circuits (ASICs), or a programmed Digital Signal Processor (DSP), gaming engine, graphics processor or microcontroller. A code in which programming instructions of the embodiments are described can be included as a firmware in a RAM, a ROM and a flash memory. Otherwise, the code can be stored in a non-transitory, tangible computer-readable storage medium such as a magnetic tape, a flexible disc, a hard disc, a compact disc, a photo-magnetic disc, a digital versatile disc (DVD) or the like and subsequently executed by the one or more processors.

The embodiments may be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general-purpose computer, but rather the special purpose computer programmed to perform the disclosed algorithm.

A general-purpose computer, or microprocessor, may be programmed to carry out the algorithm/steps for creating a new machine. The general-purpose computer becomes a special purpose computer once it is programmed to perform particular functions pursuant to instructions from program software of the embodiments described herein. The instructions of the software program that carry out the algorithm/steps electrically change the general-purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another. As used herein the expression "at least one of A and B," will be understood to mean only A, only B, or both A and B.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:

1. A method, comprising, by at least one processor:
  receiving a two-dimensional (2D) video captured by an imaging device, the imaging device includes a first height and a first angle;
  detecting objects in a scene frame of the 2D video using digital image processing;
  determine object image coordinates of the detected objects in the scene frame;
  storing the detected objects in an asset database;
  deploying a virtual camera in a three-dimensional (3D) environment to create a virtual image frame in the 3D environment;
  generating a scene floor in the 3D environment in a plane below the virtual camera;
  adjusting the virtual camera to have a second height and a second angle to adjust the virtual image frame so that the second height and the second angle of the virtual camera match the first height and the first angle of the imaging device;
  generating an extended reality (XR) coordinate location relative to the floor for placing a respective one detected object of the detected objects in the 3D environment, the XR coordinate location being a point of intersection of a ray cast of the virtual camera through the virtual frame on the floor that translates to a determined object image coordinate for the respective one detected object of the scene frame;

generating an artificially intelligent (AI) entity based on the respective one detected object being a determined human object;

associating a modifiable finite state machine (FSM) to the AI entity to create an AI agent;

placing the AI agent in the 3D environment such that the XR coordinate location translates to the determined object image coordinate for the human object of the scene frame of the 2D video; and controlling the AI agent with the modifiable FSM in the 3D environment.

2. The method of claim 1, wherein the adjusting the virtual camera to have the second height and the second angle includes, by the at least one processor:

estimating the first height and the first angle of the imaging device that captured the 2D video.

3. The method of claim 1, wherein the at least one processor includes a gaming engine; and the method further comprising, by the at least one processor:

causing a display device in communication with the gaming device to display the 3D environment combined with the respective one detected object placed at the XR coordinate location.

4. The method of claim 3, wherein the display device is coupled to a computing device comprising the at least one processor, the computing device including one of desktop computing platform, web-enabled computing platform, mobile computing platform, or head-worn device (HWD) computing platform.

5. The method of claim 1, further comprising, by the at least one processor:

classifying the detected objects to determine that a classified detected object is the human object in the scene of the 2D video; and causing the AI agent to be displayed into the 3D environment at the XR coordinate location.

6. The method of claim 5, further comprising:

receiving user-selected behaviors for controlling a simulated behavior of the AI agent;

modifying the FSM with the received behaviors; and controlling the AI agent with the modified FSM in the 3D environment.

7. The method of claim 1, further comprising, by the at least one processor:

repeating the generating of the extended reality (XR) coordinate location for each remaining detected object of the detected objects; and generating permutations of one or more frames in the 3D environment based on one or more frames of the 2D video, wherein each XR coordinate location corresponds to a point of intersection of the ray cast through the virtual frame on the floor that translates to the image coordinates of the detected objects.

8. The method of claim 7, wherein generating the permutations of the one or more frames in the 3D environment based on the one or more frames of the 2D video, comprises, by the one or more processors:

generating a simulated 3D object; and placing the simulated 3D object into the one or more frames in the 3D environment at non-occupied XR coordinate locations associated with the one or more frames in the 3D environment.

9. The method of claim 8, further comprising:

generating an artificially intelligent (AI) agent in the 3D environment of the simulated 3D object;

causing the AI agent of the simulated 3D object to be displayed into the 3D environment;

receiving user-selected behaviors for controlling a simulated behavior of the AI agent of the simulated 3D object in the 3D environment;

modifying a finite state machine (FSM) with the received behaviors for the AI agent of the simulated 3D object; and controlling the AI agent of the simulated 3D object with the modified FSM in the 3D environment to adapt the behaviors relative to one of the simulated object and the respective one detected object.

10. A tangible, non-transitory computer storage media having programming instructions stored thereon which, when executed, cause at least one processor to:

receive a two-dimensional (2D) video captured by an imaging device, the imaging device includes a first height and a first angle;

detect objects in a scene frame of the 2D video using digital image processing;

determine object image coordinates of the detected objects in the scene frame;

store the detected objects in an asset database;

deploy a virtual camera in a three-dimensional (3D) environment to create a virtual image frame in the 3D environment;

generate a scene floor in the 3D environment in a plane below the virtual camera;

adjust the virtual camera to have a second height and a second angle to adjust the virtual image frame so that the second height and the second angle of the virtual camera match the first height and the first angle of the imaging device;

generate an extended reality (XR) coordinate location relative to the floor for placing a respective one detected object of the detected objects in the 3D environment, the XR coordinate location being a point of intersection of a ray cast of the virtual camera through the virtual frame on the floor that translates to a determined object image coordinate for the respective one detected object of the scene frame;

generate an artificially intelligent (AI) entity based on the respective one detected object being a determined human object;

associate a modifiable finite state machine (FSM) to the AI entity to create an AI agent;

place the AI agent in the 3D environment such that the XR coordinate location translates to the determined object image coordinate for the human object of the scene frame of the 2D video; and control the AI agent with the modifiable FSM in the 3D environment.

11. The tangible, non-transitory computer storage media of claim 10, wherein the programming instructions which cause the at least one processor to adjust the virtual camera to have the second height and the second angle further includes programming instructions which, when executed, cause the at least one processor to:

estimate the first height and the first angle of the imaging device that captured the 2D video.

12. The tangible, non-transitory computer storage media of claim 10, wherein the at least one processor includes a gaming engine; and further comprising programming instructions which, when executed, cause the at least one processor to:

cause a display device in communication with the gaming engine to display the 3D environment combined with the respective one detected object placed at the XR coordinate location.

13. The tangible, non-transitory computer storage media of claim 12, wherein the display device is coupled to a computing device comprising the at least one processor, the computing device including one of desktop computing platform, web-enabled computing platform, mobile computing platform, or head-worn device (HWD) computing platform.

14. The tangible, non-transitory computer storage media of claim 10, further comprising programming instructions which, when executed, cause the at least one processor to:
classify the detected objects to determine that a classified detected object is the human object in the scene of the 2D video; and
cause the AI agent to be displayed into the 3D environment at the XR coordinate location.

15. The tangible, non-transitory computer storage media of claim 14, further comprising programming instructions which, when executed, cause the at least one processor to:
receive user-selected behaviors for controlling a simulated behavior of the AI agent;
modify the FSM with the received behaviors; and
control the AI agent with the modified FSM in the 3D environment.

16. The tangible, non-transitory computer storage media of claim 10, further comprising programming instructions which, when executed, cause the at least one processor to:
repeat the generating of the extended reality (XR) coordinate location for each remaining detected object of the detected objects; and
generate permutations of one or more frames in the 3D environment based on one or more frames of the 2D video,
wherein each XR coordinate location corresponds to a point of intersection of the ray cast through the virtual frame on the floor that translates to the image coordinates of the detected objects.

17. The tangible, non-transitory computer storage media of claim 16, wherein the programming instructions which generate the permutations of the one or more frames in the 3D environment based on the one or more frames of the 2D video, include programming instructions which, when executed, cause the at least one processor to:
generate a simulated 3D object; and
place the simulated 3D object into the one or more frames in the 3D environment at non-occupied XR coordinate locations associated with the one or more frames in the 3D environment.

18. The tangible, non-transitory computer storage media of claim 17, further comprising programming instructions which, when executed, cause the at least one processor to:
generate an artificially intelligent (AI) agent of the simulated 3D object in the 3D environment;
cause the AI agent of the simulated 3D object to be displayed into the 3D;
receive user-selected behaviors for controlling a simulated behavior of the AI agent of the simulated 3D object in the 3D environment;
modify a finite state machine (FSM) with the received behaviors for the AI agent of the simulated 3D object; and
control the AI agent of the simulated 3D object with the modified FSM in the 3D environment to adapt the behaviors relative to one of the simulated object and the respective one detected object.

19. The tangible, non-transitory computer storage media of claim 14, further comprising programming instructions which, when executed, cause the at least one processor to:
receive user-selected behaviors for controlling a simulated behavior of the AI agent;
modify the FSM with the received behaviors; and
controlling the AI agent with the modified FSM in the 3D environment to adapt the behaviors relative to one of a simulated object injected into the 3D environment and the human object.

20. The method of claim 5, further comprising, by the at least one processor:
receiving user-selected behaviors for controlling a simulated behavior of the AI agent;
modifying the FSM with the received behaviors; and
controlling the AI agent with the modified FSM in the 3D environment to adapt the behaviors relative to one of a simulated object injected into the 3D environment and the human object.

* * * * *